United States Patent [19]

Spencer

[11] Patent Number: 4,673,935

[45] Date of Patent: Jun. 16, 1987

[54] INSTRUSION DETECTION SYSTEM

[75] Inventor: Donald B. Spencer, Federal Way, Wash.

[73] Assignee: The Boeing Company, Seattle, Wash.

[21] Appl. No.: 574,039

[22] Filed: Jan. 26, 1984

[51] Int. Cl.[4] .............................................. G01S 13/04
[52] U.S. Cl. ...................................... 342/27; 340/554; 340/552
[58] Field of Search ................... 340/552, 554, 541; 343/5 PD

[56] References Cited

U.S. PATENT DOCUMENTS

| | | | |
|---|---|---|---|
| 3,031,643 | 5/1960 | Sheftelman | 340/258 |
| 3,098,988 | 7/1963 | Hafner | 333/95 |
| 3,422,431 | 1/1969 | Hafner | 343/13 |
| 3,466,651 | 9/1969 | Bigelow | 343/13 |
| 3,703,722 | 11/1972 | Gershberg | 343/5 |
| 3,728,721 | 4/1973 | Lee et al. | 343/5 |
| 3,890,615 | 6/1975 | Moran | 343/5 PD |
| 3,906,492 | 9/1975 | Narbaits-Jaureguy et al. | 343/5 PD |
| 4,079,361 | 3/1978 | Woode | 340/258 |
| 4,091,367 | 5/1978 | Harman | 340/258 |
| 4,135,185 | 1/1979 | Rotman et al. | 340/552 |
| 4,187,501 | 2/1980 | Olesch et al. | 340/554 |
| 4,191,953 | 3/1980 | Woode | 340/552 |
| 4,207,560 | 6/1980 | Poirier | 340/552 |
| 4,213,122 | 7/1980 | Rotman et al. | 340/552 |
| 4,224,607 | 9/1980 | Poirier et al. | 340/552 |
| 4,318,102 | 3/1982 | Poirier | 340/552 |
| 4,328,487 | 5/1982 | Cheal | 343/5 PD |
| 4,358,764 | 11/1982 | Cheal et al. | 340/554 |
| 4,360,810 | 11/1982 | Landt | 343/5 |
| 4,401,980 | 8/1983 | Rittenbach et al. | 340/541 |
| 4,458,240 | 7/1984 | Rittenbach et al. | 340/554 |
| 4,501,399 | 2/1985 | Loomis III | 343/16 M |

FOREIGN PATENT DOCUMENTS 832086 7/1958 United Kingdom ............... 340/552

Primary Examiner—Thomas H. Tarcza
Assistant Examiner—Donald R. Hayes
Attorney, Agent, or Firm—Christensen, O'Connor, Johnson & Kindness

[57] ABSTRACT

An intrusion detection system that comprises a transmission line for RF energy, a transmitter coupled to one end of the transmission line to supply pulses of RF energy into the line, and a range gated doppler receiver for receiving RF energy from the other end of the transmission line. The receiver includes means for producing a detection signal indicating the presence of doppler components in a range gated portion of the RF energy received from the transmission line.

6 Claims, 5 Drawing Figures

INSTRUSION DETECTION SYSTEM

FIELD OF THE INVENTION

This invention relates to intrusion detection systems, and more particularly to systems for detecting the presence of a moving target within a detection zone.

BACKGROUND OF THE INVENTION

Various types of intrusion detection systems have been proposed, including systems based on ultrasonics, optical detection, infrared detection, and microwave detection. In one common type of system, energy is transmitted into a selected space surrounding the area to be protected, and energy reflected from objects in such space is received and monitored. An alarm is activated if reflections are received indicating the presence of an intruder.

One class of prior intrusion detection systems has relied on the doppler principle. In these systems, microwave energy reflected from the selected space is examined for the presence of doppler shifted components, indicating the presence of a moving target within the space.

Doppler intrusion detection systems to date have not proven adequately sensitive to slow moving targets, and have been inordinately sensitive to small animals and environmental factors such as rain, wind, noise, and the rate of change of these factors. One approach to minimizing these adverse effects has been to transmit RF energy into the monitored space from buried leaky coaxial cables. Such systems have suffered from the fact that the cables were buried and thus a majority of the RF energy was kept below ground, and further from the fact that a pole vaulter could cross the detection zone without triggering an alarm. Systems based on buried cables also typically include large returns from outside the desired detection zone, and the systems are subject to additional degradation by high conductivity soils.

SUMMARY OF THE INVENTION

The present invention provides an intrusion detection system that provides a detection zone around the area to be protected. In one embodiment, the system comprises an RF transmission line, a transmitter adapted to supply pulses of RF energy into one end of the line, and a receiver for receiving RF energy from the other end of the line. The transmission line includes either discrete or uniform means for radiating and receiving energy. The receiver includes range gated doppler detection means for producing a detection signal indicative of the presence of doppler components in a range gated portion of the RF energy received from the transmission line.

The use of a range gated receiver prevents false alarms due to large objects (e.g., vehicles) outside the monitored space. Range gating also prevents false alarms from small objects (e.g. birds) very close to the transmission line. In addition, by providing the transmission line along the perimeter of an area to be protected, an intruder approaching that area will always be coming toward at least a portion of the detection system, and will therefore have a comparatively large radial velocity with respect to that portion. The intrusion detection system of the present invention thereby provides a very high probability of detecting an intruder, coupled with a very low probability of a false alarm.

These and other features of the invention will be apparent from the detailed description and claims to follow, taken in conjunction with the accompanying drawings.

DETAILED DESCRIPTION OF THE DRAWINGS

Figure 1:
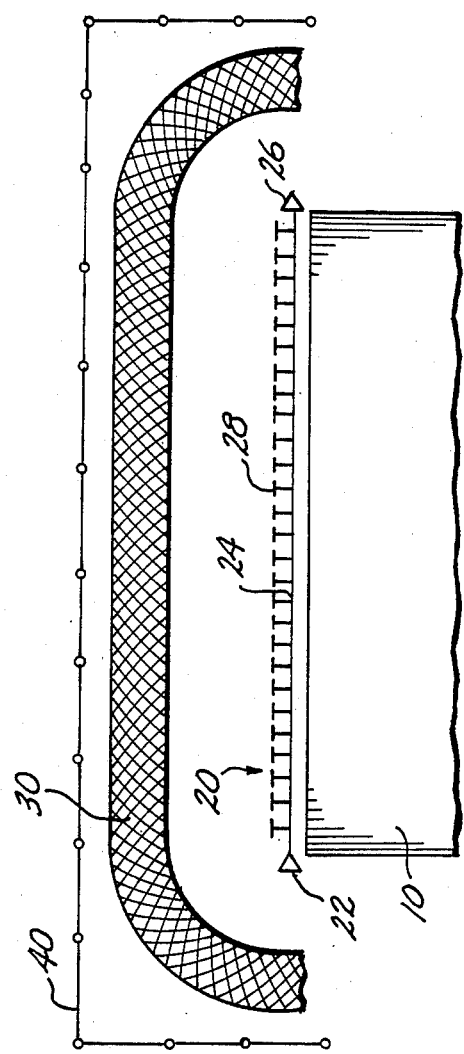
FIG. 1 is a schematic diagram of an intrusion detection system according to the present invention.

FIG. 1 is a schematic view of one embodiment of the intrusion detection system of the present invention. In FIG. 1, numeral 10 represents a portion of a building or other area to be protected from intrusion. the intrusion detection system for protecting one side of building 10 is indicated generally by numeral 20. The system includes a transmission line 24, a transmitter 22 connected to one end of line 24, and a receiver 26 connected to the other end of line 24. Coupled to line 24 along its length are a plurality of discrete radiating/receiving elements, one such element being indicated by numeral 28. Transmitter 22 supplies pulses of RF energy to line 24, and the pulses cause each element 28 to radiate RF energy into the space surrounding building 10. RF energy reflected back towards line 24 (e.g. by an intruder) is received by one or more elements 28 and passes through line 24 to receiver 26.

Receiver 26 is a range gated, doppler receiver. Range gating the return signal results in a detection zone 30 disposed a fixed distance from line 24. It is to be understood that zone 30 could be extended about the remaining sides of building 10 by encircling the building with line 24 or by providing additional intrusion detection systems similar to system 20 along the other sides of the building. The system of the present invention will detect moving targets within zone 30, but will not respond to targets outside such zone. In FIG. 1, a fence 40 is included as an additional security device. The fence also serves the purpose of keeping small animals out of detection zone 30, thereby decreasing the incidence of false alarms. In some applications, the boundary of area 10 will represent a second fence, and the intrusion detection system of the present invention will monitor the corridor between the two fences. In such applications, the system has the advantage that detection zone 30 will follow the terrain traversed by the fences, and variations in terrain will therefore offer no protection to an intruder.

It is an important aspect of the present invention that transmitter 22 and receiver 26 are connected to opposite ends of transmission line 24. For many practical applications, however, it will be preferable for transmitter 22 and receiver 26 to be enclosed within the same physical unit. In such cases, a coaxial cable or other nonradiating transmission means can be used to return the signal received at the far end of line 24 to the transmitter/- receiver. Through the use of nonradiating return lines, a single centrally located transmitter/receiver unit could drive two or more transmission lines to provide extended perimeter coverage.

Figure 2:
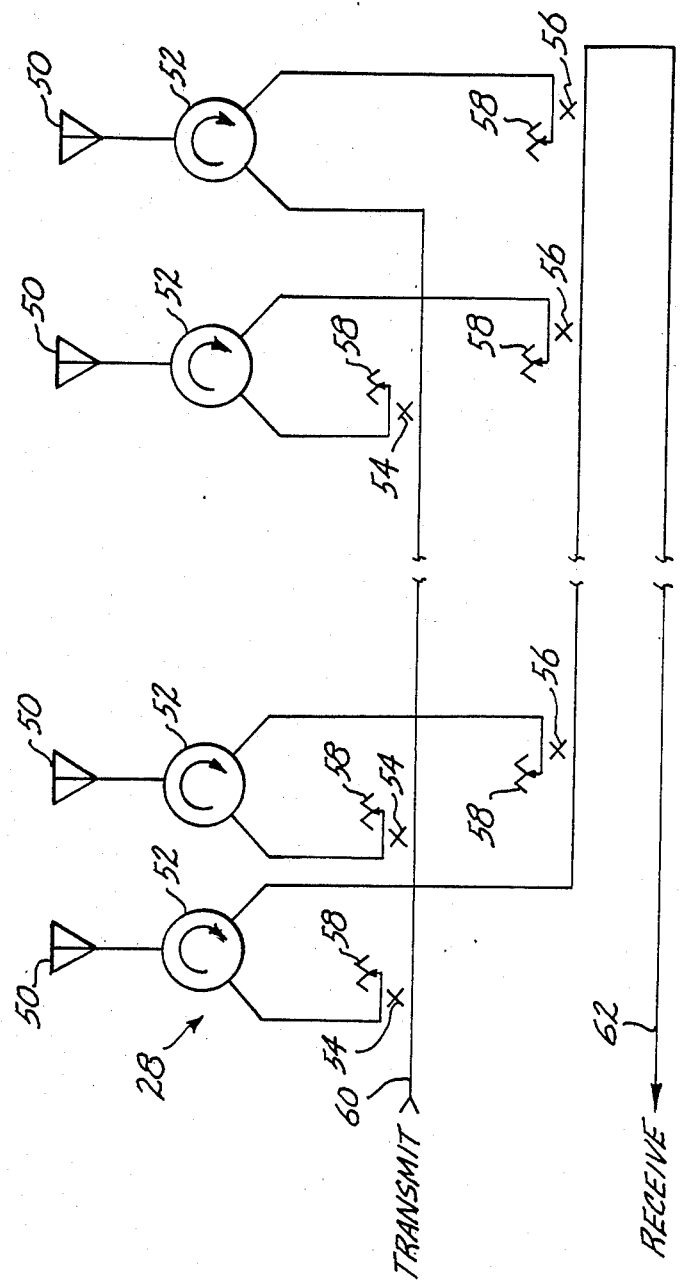
FIG. 2 is a schematic view of the transmission line of the present invention, showing a number of discrete antennas coupled to said line.

FIG. 2 illustrates one preferred embodiment of line 24 and radiating/receiving elements 28 in greater detail. As indicated in FIG. 2, line 24 includes separate transmit and receive lines 60 and 62, respectively, and each element 28 includes an antenna 50 coupled to transmit line 60 and receive line 62 through a circulator 52. The transmit and receive lines are preferably coaxial cables or equivalent nonradiating transmission means. It will be appreciated that any direct coupling that does occur between the transmitted signal on line 60 and the received signal on line 62 will not significantly degrade the system's performance, because such leakage signals will be screened out by the range gating in the receiver. Each circulator 52 is coupled to transmit line 60 and receive line 62 through directional couplers 54 and 56, respectively, except for the first coupling to the receive line and the last coupling to the transmit line, which are direct connections. Directional couplers 54 permit significant transfer of RF energy only from transmit line 62 to circulators 52. Directional couplers 56 allow significant transfer of RF energy only from circulators 52 to receive line 62. Each coupling also includes a conventional terminating load 58. The degree of coupling provided by directional couplers 54 and 56 may be adjusted, as described below, to improve system performance, and particularly to provide uniform sensitivity along the length of the transmission line.

In a second preferred embodiment of the present invention, each element 28 would include two antennas, one antenna connected to transmit line 60 and the second antenna connected to receive line 62. The connection between transmit line 60 and the first antenna would be by means of a directional coupler adapted to permit significant energy transfer only from the line to the antenna. Similarly, the connection between the second antenna and receive line 62 would be by means of a directional coupler adapted to permit significant energy transfer only from the antenna to the line. In this second embodiment, circulators 52 would not be needed.

Figure 3:
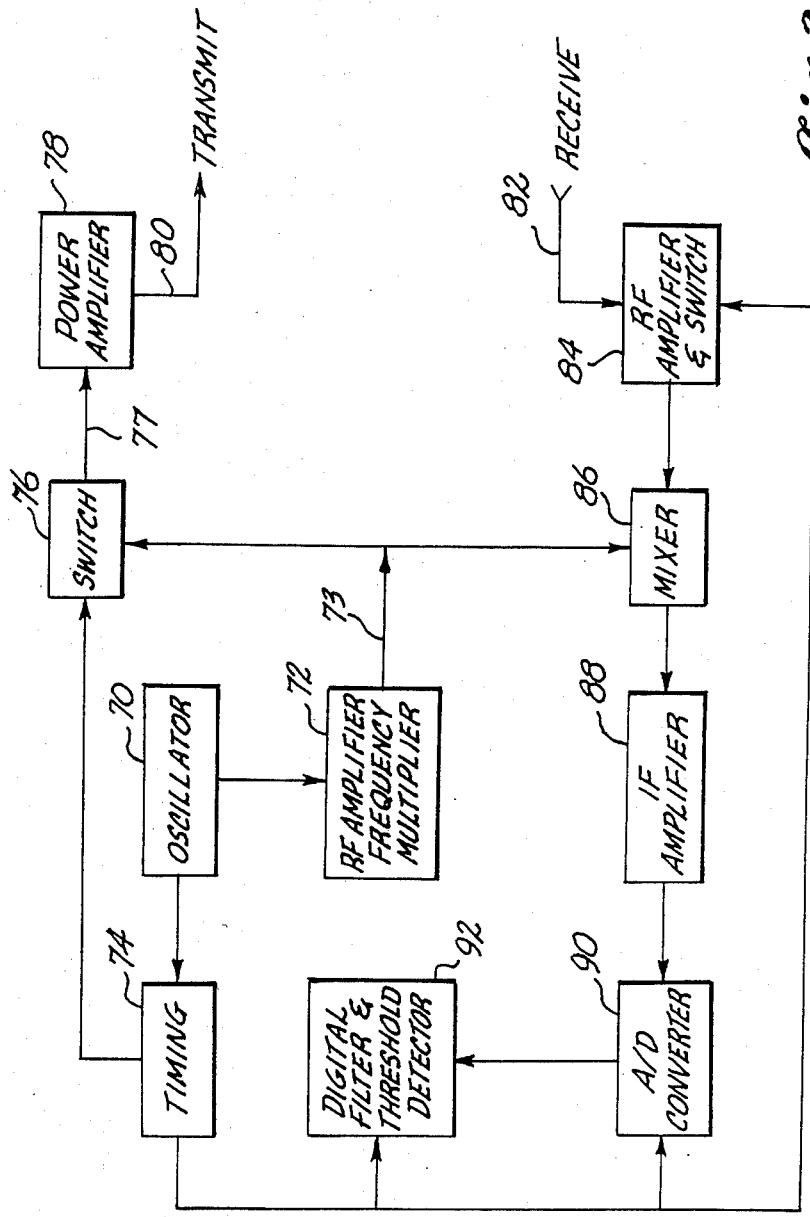
FIG. 3 is a block diagram of a transmitter and receiver for use in the system of the present invention.

FIG. 3 is a block diagram showing one set of components suitable for implementing the intrusion detection system of the present invention. Oscillator 70 generates a single frequency CW signal that is amplified and frequency multiplied in block 72 to produce signal 73. the frequency of signal 73 is selected to correspond to the particular detection needs of the system. Typically, the frequency of signal 73 will be in the range 200 MHz-2 GHz. For the purpose of describing the present embodiment, it will be assumed that signal 73 has a frequency of 300 MHz.

A signal from oscillator 70 is also sent to timing circuitry 74. The timing circuitry controls and coordinates the operation of a number of circuit components, as described below, to produce a completely coherent detection system. One function of timing circuit 74 is to periodically open and close switch 76 so as to produce a pulsed 300 MHz signal 77. The pulse repetition frequency(PRF) of signal 77 may be adjusted based on considerations well known to those skilled in the art. In general, a PRF that is too low will result in radiation of insufficient power, while a PRF that is too high will result in range ambiguity. If a high PRF is desired for a particular application, then coding means (not shown) could be added to the circuit shown in FIG. 3 to eliminate the range ambiguity. For the purpose of the present description, a PRF of 100 KHz will be assumed.

The pulsed signal 77 is amplified by power amplifier 78, and the resulting signal 80 is coupled directly to transmit line 60 (FIG. 2). The return signal 82 is coupled from receive line 62 (FIG. 2) to RF amplifier and switch 84. Switch 84 is controlled by timing circuit 74 such that it passes only those returned signals occurring within a specified range gate. Return signals occurring within such range gate are amplified and sent to mixer 86. Mixer 86 combines the gated return signal with CW signal 73, and the first PRF spectral line of the resulting signal (e.g., frequencies near 100 KHz) is amplified by IF amplifier 88 and sent to A/D converter 90. A/D converter 90 samples the signal from IF amplifier 88 at a rate controlled by timing circuit 74, and sends the resulting digital samples to digital filter and threshold detector 92. The digital filter removes nondoppler components from the sampled signal, and the threshold detector provides an intrusion detection signal if the magnitude of the remaining doppler components exceeds a preselected threshold.

Figure 4:
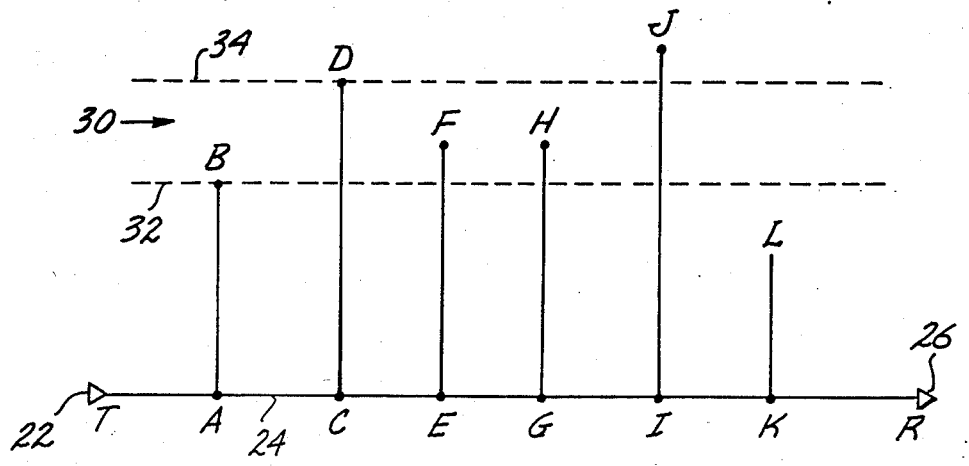
FIG. 4 is a schematic diagram showing the effect of range gating according to the present invention.

The effect of using a range gated receiver is illustrated diagrammatically in FIG. 4. FIG. 4 shows transmitter 22, receiver 26 and transmission line 24 as described above. Points A, C, E, G, I and K represent the positions of particular radiating/receiving elements 28 distributed along line 24 (see FIG. 1). According to the present invention, receiver 26 is range gated such that it passes only those signals received during a fixed time interval following each pulse transmitted by transmitter 22. The selection of a particular time interval determines the dimensions of detection zone 30. As indicated in FIG. 4, zone 30 extends from an inner boundary 32 to an outer boundary 34. If the time interval for range gating is defined as extending from times $t_1$ to $t_2$ after the transmission of each pulse, then times $t_1$ and $t_2$ will determine the distances of inner and outer boundaries 32 and 34, respectively, from line 24. In particular, $t_1$ will be the time required for radiation to travel from transmitter 22 to point A, from point A to point B and back to point A again, and then from point A to receiver 26. In a similar manner, time $t_2$ will be the time required for radiation to travel the path TC/CD/DC/CR. By use of the foregoing relationships, times $t_1$ and $t_2$ can be selected to provide a range gate interval suitable to a particular intrusion detection application.

Still referring to FIG. 4, it will be apparent that returns from moving targets at points F and H will be received at the same time, within the range gate. This is due to the fact that the path length TE/EF/FE/ER is equal to the path length TG/GH/HG/GR, and that both of these paths are within the range gate specified by $t_1$ and $t_2$. A moving target at point J, however, will be outside the range gate and will therefore not trigger threshold detector 92 (FIG. 3). Even very large targets beyond detection zone 30 will not cause false alarms or otherwise degrade the operation of the system.

The detection cutoff at the inner boundary 32 of zone 30 is not as sharp as the cutoff at the outer boundary 34. This can be seen by considering a target at point L. Although radiation traveling path TK/KL/LK/KR will be outside of the range gate and therefore not result in detection, a target at point L could be detected by radiation transmitted and received by another element, such as the element at point G. the probability of detection does, however, decrease as target points move inwards from boundary 32, because the number of elements within the range gate decreases as a target approaches line 24, and because of the phase relationships between signals from different elements, as discussed below.

Figure 5:
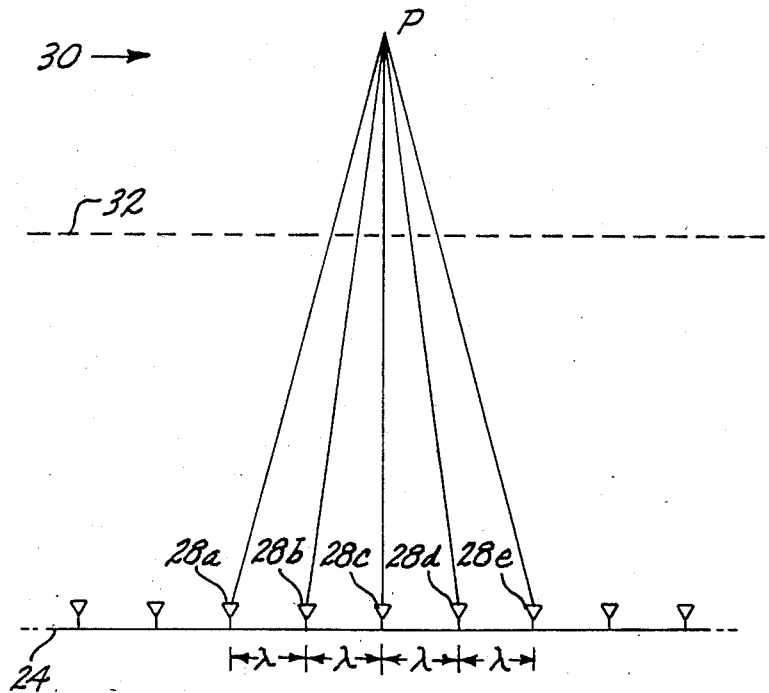
FIG. 5 is a schematic diagram showing radiation of a target by five adjacent antennas.

In one preferred embodiment of the intrusion detection system of the present invention, the length of each pulse transmitted by transmitter 22, and the spacing of the transmitting/receiving elements 28 along line 24, are controlled to optimize the performance of the system. FIG. 5 illustrates such an embodiment including a portion of line 24, a number of radiating/receiving elements 28a, 28b, 28c, 28d and 28e, and detection zone 30 with inner boundary 32 and outer boundary 34. As indicated in FIG. 5, elements 28a-e are spaced along line 24 such that the distance between neighboring elements is equal to the wavelength of the radiation traveling through line 24. For example, for a system operating at 300 MHz, the wavelength in free space would be 1 meter, while the wavelength in a typical coaxial cable used for line 24 might be 0.81 meters. For such a cable, the distance between neighboring elements 28a-e would be selected to be 0.81 meters. The result of this spacing would be that each element would radiate in phase with other elements in response to a given pulse. The length of each pulse traveling through line 24 is controlled such that the pulse includes a small integral number of oscillation periods of the radiation. For example, at 300 MHz, a pulse having a 16.7 nanosecond duration would include five cycles. Such a pulse would therefore cause five elements to radiate at any given time. FIG. 5 shows a target P being illuminated by the five adjacent elements 28a-28e. The difference in distance of each of these five elements from the target is small enough so that the returns from these five elements generally constructively interfere with one another, thereby enhancing the strength of the return signal from target P. However, for targets positioned between line 24 and inner boundary 32, the difference in path lengths from the target to the various elements is the same order as the wavelength of the radiation itself. The result, on the average, is a destructive interference which decreases the strength of the net return signal. In combination with the range effects described above, the result is a diminishing probability of detection as a target approaches line 24.

Referring again to FIG. 1, it may be appreciated that as a pulse of RF energy travels down transmission line 24, the pulse continuously loses power as portions of the pulse energy are successively coupled to elements 28 and radiated into space. If the strength of the coupling of each element 28 to line 24 was made equal, then the result would be that the strength of the radiation about line 24 would continuously decrease toward receiver 26. As a result, there would be a lower probability of detecting an intruder in zone 30 near receiver 26 than near transmitter 22. To avoid this situation, and to provide an essentially uniform detection probability along the length of zone 30, the strength of the coupling between elements 28 and line 24 can be continuously increased towards received 26. Referring to FIG. 2, for a line comprising 100 elements, coupler 54 for the first element would ideally extract 1/100 of the power from line 60, coupler 54 for the second element would extract 1/99 of the power, etc. In practice, a less exact scheme would generally be satisfactory. For example, each of the first ten elements could extract 1/100 of the power in line 60, each of the next ten elements could extract 1/90 of the power, etc. By such means, an essentially uniform detection probability can be created along the entire length of zone 30. Whatever technique is used, couplers 54 and 56 for a given element 28 will preferably provide equal amounts of coupling.

Referring again to FIG. 1, intrusion detection system 20 could comprise a transmission line that radiates continuously along its length, such as a leaky coaxial cable. In such a system, means would be provided to eliminate nulls in the radiation pattern and unwanted reflection. For this reason, the system of discrete transmitting elements 28, as shown in FIG. 1, is preferred.

While the preferred embodiments of the invention have been illustrated and described herein, it should be understood that variations will be apparent to those skilled in the art. Accordingly, the invention is not to be limited to the specific embodiments illustrated, but the true scope and spirit of the invention is to be determined by reference to the appended claims.

The embodiments of the invention in which an exclusive property or privilege is claimed are defined as follows:

1. A system for detecting the presence of a moving target within a detection zone comprising:
   a transmission line for RF energy, the transmission line including means for radiating RF energy travelling through the transmission line into the detection zone and for receiving reflected energy returning from the detection zone;
   a transmitter adapted to supply pulses of RF energy into one end of said line; and
   a receiver including range gate means for receiving and range gating RF energy from the other end of said line to produce a range gated signal, and doppler detection means for producing a detection signal indicative of the presence of doppler components in the range gated signal.

2. The system of claim 1, wherein the means for radiating RF energy comprises a plurality of antennas coupled to said line at spaced apart positions along its length.

3. The system of claim 2, wherein the transmission line comprises first and second energy propagating lines, wherein the transmitter is connected to said first line and the receiver is connected to said second line, wherein each antenna is connected to said first and second lines by directional coupling means that permits significant transfer of energy only from the first line to the antenna and from the antenna to the second line.

4. The system of claim 3, wherein the directional coupling means for each antenna comprises a circulator connected to the antenna and also connected to said first and second lines by means of first and second directional couplers, the first directional coupler being adapted to permit significant transfer of energy only from the first line to the antenna, and the second directional coupler being adapted to permit significant transfer of energy only from the antenna to the second line.

5. The system of claim 2, wherein the positions at which the antennas are coupled to said line are located such that all antennas radiate in phase in response to each pulse.

6. The system of claim 2, wherein the coupling between the antennas and said line is adapted such that each antenna radiates approximately the same amount of energy in response to each pulse.

* * * * *